United States Patent
Hamdan et al.

(10) Patent No.: US 7,279,935 B2
(45) Date of Patent: Oct. 9, 2007

(54) METHOD AND APPARATUS FOR REDUCING CLOCK ENABLE SETUP TIME IN A MULTI-ENABLED CLOCK GATING CIRCUIT

(75) Inventors: Fadi Adel Hamdan, Raleigh, NC (US); Jeffrey Herbert Fischer, Cary, NC (US); William James Goodall, III, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 11/371,380

(22) Filed: Mar. 9, 2006

(65) Prior Publication Data

US 2007/0210833 A1 Sep. 13, 2007

(51) Int. Cl.
*H03K 19/00* (2006.01)
*H03K 19/096* (2006.01)
(52) U.S. Cl. .......................... 326/93; 326/98; 327/291
(58) Field of Classification Search .................. 326/93, 326/95–98; 327/291
See application file for complete search history.

(56) References Cited

U.S. PATENT DOCUMENTS 5,926,487 A * 7/1999 Chappell et al. ............ 714/731
2006/0041802 A1 * 2/2006 Grise et al. .................. 714/724

* cited by examiner

*Primary Examiner*—Rexford Barnie
*Assistant Examiner*—Jason Crawford
(74) *Attorney, Agent, or Firm*—Nicholas J. Pauley; Thomas R. Rouse

(57) ABSTRACT

A multi-enabled clock gating circuit reduces clock enable setup time. In one example, the multi-enabled clock gating circuit comprises an OAI logic gate and a clock enable control circuit. The OAI logic gate is configured to generate a gated clock signal by inverting an input clock signal responsive to one of a timing-sensitive clock enable signal and a timing-insensitive clock enable signal being active. The clock enable control circuit is configured to prevent the OAI logic gate from receiving the timing-insensitive clock enable signal responsive to the timing-sensitive clock enable signal being active. In one or more embodiments, a multi-enabled clock gating circuit having reduced clock enable setup time may be included in an integrated circuit for implementing clock gating during different operating modes of the integrated circuit.

30 Claims, 5 Drawing Sheets

METHOD AND APPARATUS FOR REDUCING CLOCK ENABLE SETUP TIME IN A MULTI-ENABLED CLOCK GATING CIRCUIT

FIELD

The present disclosure generally relates to clock gating, and particularly relates to reducing clock enable setup time in multi-enabled clock gating circuits.

BACKGROUND

Clock-gating is a widely adopted technique for deactivating particular resources within an integrated circuit (IC). A clock gating circuit deactivates an IC resource by gating a clock signal provided to the resource. In response to an active clock enable signal, the clock gating circuit passes the clock signal to a target resource. Conversely, the clock gating circuit inhibits or blocks the clock signal from reaching the target resource when the clock enable signal is inactive.

In some cases, a clock gating circuit receives more than one clock enable signal. Each clock enable signal facilitates clock gating during a particular application. For example, one clock enable signal gates functional clocking of an IC resource during normal operation of the IC and a different clock enable signal gates test clocking of the IC resource during testing of the IC. Conventional multi-enabled clock gating circuits include a clock enable selection mechanism such as a multiplexer or other combinatorial logic. The clock enable selection mechanism selects one of a plurality of clock enable signals for activating clock gating during a particular application.

However, conventional multi-enabled clock gating circuits, particularly the clock enable selection mechanisms thereof, add delay to the clock enable signal paths. Conventional clock enable selection mechanisms subject clock enable signals to additional signal propagation delay not experienced by the internal clock signal to be gated. That is, the clock enable signals are processed by the clock enable selection mechanism before gating the internal clock signal. Unlike the clock enable signals, the clock signal to be gated does not propagate through the clock enable selection mechanism, and thus, is not subjected to the corresponding additional delay.

The additional delay incurred by the clock enable signals increases the setup time associated with the signals. That is, the clock enable signals should arrive at the clock gating circuit sufficiently in advance of the clock signal to be gated. Otherwise, the gated clock signal will be skewed. Circuits downstream from the clock gating circuit may function unpredictably in response to a skewed clock signal. Clock-gating induced skew can be reduced by increasing setup time associated with the clock enable signals. However, increased setup time adversely affects IC performance, i.e., the maximum attainable operating frequency of the IC is decreased. This is of particular concern for clock enable signals that gate functional clocking of an IC resource during normal operation of the IC.

SUMMARY OF THE DISCLOSURE

According to the methods and apparatus taught herein, a multi-enabled clock gating circuit comprises an or-and-invert (OAI) logic gate and a clock enable control circuit. The OAI logic gate is configured to generate a gated clock signal by inverting an input clock signal responsive to one of a timing-sensitive clock enable signal and a timing-insensitive clock enable signal being active. The clock enable control circuit is configured to prevent the OAI logic gate from receiving the timing-insensitive clock enable signal responsive to the timing-sensitive clock enable signal being active.

Thus, in at least one embodiment, an OAI logic gate for use in a multi-enabled clock gating circuit comprises a clock gating stage and an enabling stage. The clock gating stage is configured to generate a gated clock signal by inverting an input clock signal when the clock gating stage is enabled and inhibit the generation of the gated clock signal when the clock gating stage is disabled. The enabling stage is configured to enable the clock gating stage responsive to one of a timing-sensitive clock enable signal and a timing-insensitive clock enable being active and disable the clock gating stage responsive to the clock enable signals being inactive.

In one or more embodiments, a method of reducing clock enable setup time in a multi-enabled clock gating circuit by an OAI logic gate comprises generating a gated clock signal by inverting an input clock signal responsive to one of a first and second clock enable signals being active and preventing the OAI logic gate from receiving more than one active clock enable signal.

Of course, the present disclosure is not limited to the above features. Those skilled in the art will recognize additional features upon reading the following detailed description, and upon viewing the accompanying drawings.

DETAILED DESCRIPTION

Figure 1:
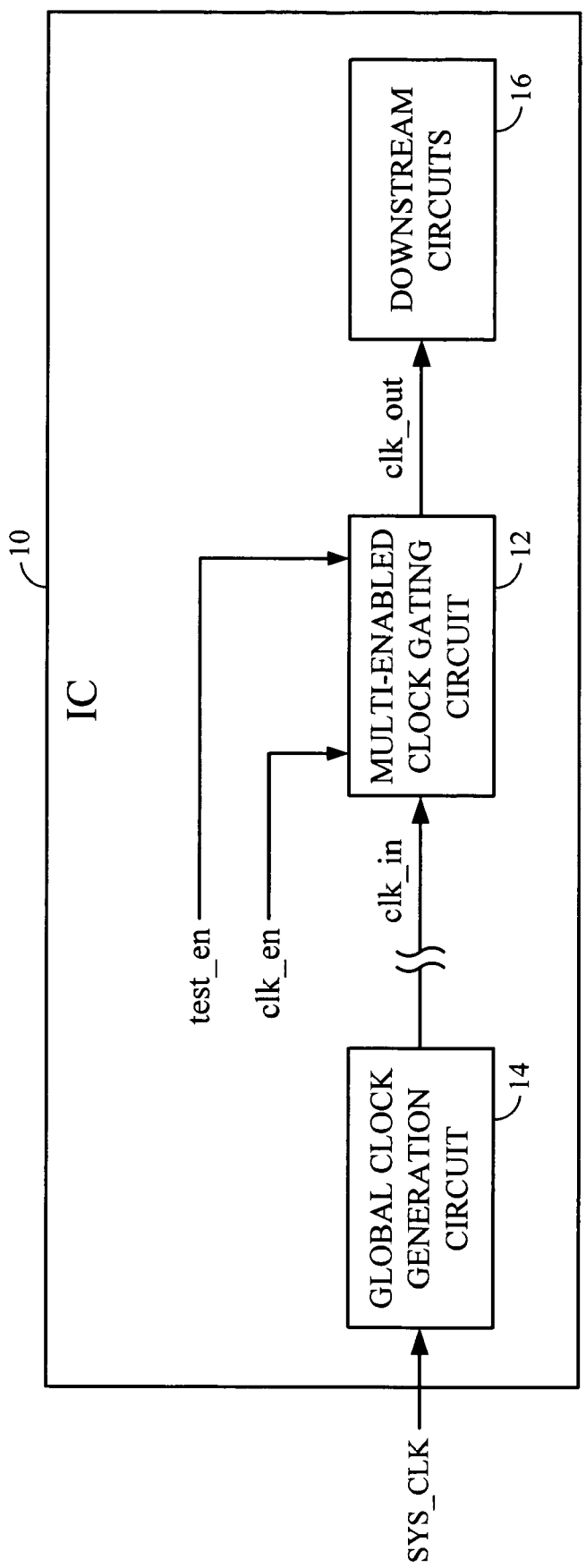
FIG. 1 is a block diagram of an integrated circuit including a multi-enabled clock gating circuit.

FIG. 1 illustrates an integrated circuit (IC) 10 including a multi-enabled clock gating circuit 12 having reduced clock enable setup time. The IC 10 may be any IC that implements multi-enabled clock gating such as a microprocessor or an Application-Specific IC (ASIC). The IC further includes a global clock generation circuit 14. In one example, the global clock generation circuit 14 comprises a phase-locked loop (PLL). The global clock generation circuit 14 receives an external system clock signal (sys_clk) and generates an internal clock signal (clk_in) in response to sys_clk. The internal clock signal clk_in provides a time reference for the movement of data within the IC 10. The multi-enabled clock gating circuit 12 receives clk_in either directly from the global clock generation circuit 14 or indirectly from a clock distribution tree (not shown).

The IC 10 operates in one of two modes. The IC 10 operates in a peak-performance operating mode when the maximum attainable operating frequency of the IC 10 is desired. The IC 10 operates in a reduced-performance operating mode in all other cases, e.g., low power or testing modes. The multi-enabled clock gating circuit 12 generates a gated clock signal output (clk_out) for use by downstream circuits 16 during both operating modes.

When the IC 10 is in peak-performance mode, the multi-enabled clock gating circuit 12 reduces clock enable setup time by directly gating clk_in with a timing-sensitive clock enable signal, i.e., a clock enable signal that adversely impacts the maximum attainable operating frequency of the IC 10 during peak-performance. To reduce setup time associated with the timing-sensitive clock enable signal, the multi-enabled clock gating circuit 12 subjects clk_in and the timing-sensitive clock enable signal to the same delay. Reducing the setup time associated with the timing-sensitive clock enable signal correspondingly reduces clock-gating induced skew. When the skew associated with clk_out is reduced, the attainable operating frequency of downstream circuits 16 that receive clk_out may be increased during normal functional operation of the IC 10.

When the IC 10 is in a reduced-performance mode, the maximum attainable operating frequency of the downstream circuits 16 is less critical. Thus, the multi-enabled clock gating circuit 12 gates clk_in using a timing-insensitive clock enable signal, i.e., a clock enable signal that does not adversely impact the maximum attainable operating frequency of the IC 10 during peak-performance.

Further, the multi-enabled clock gating circuit 12 gates the timing-insensitive clock enable signal to inhibit the timing-insensitive clock enable signal when the timing-sensitive clock enable signal is active. By so gating, the multi-enabled clock gating circuit 12 is unaffected by the timing-insensitive clock enable signal when the timing-sensitive clock enable signal is active. Conversely, the timing-insensitive clock enable signal gates clk_in when the timing-sensitive clock enable signal is inactive. The clock enable gating process subjects the timing-insensitive clock enable signal to delay not experienced by the timing-sensitive clock enable signal. The additional delay experienced by the timing-insensitive clock enable signal causes clock-gating induced skew if uncompensated. To reduce clock-gating induced skew, the setup time associated with the timing-insensitive clock enable signal is increased. However, because the timing-insensitive clock enable signal is active during a reduced-performance mode of the IC 10, increasing the setup time associated with the timing-insensitive clock enable signal does not adversely impact the functional performance of the IC during peak-performance.

Figure 2:
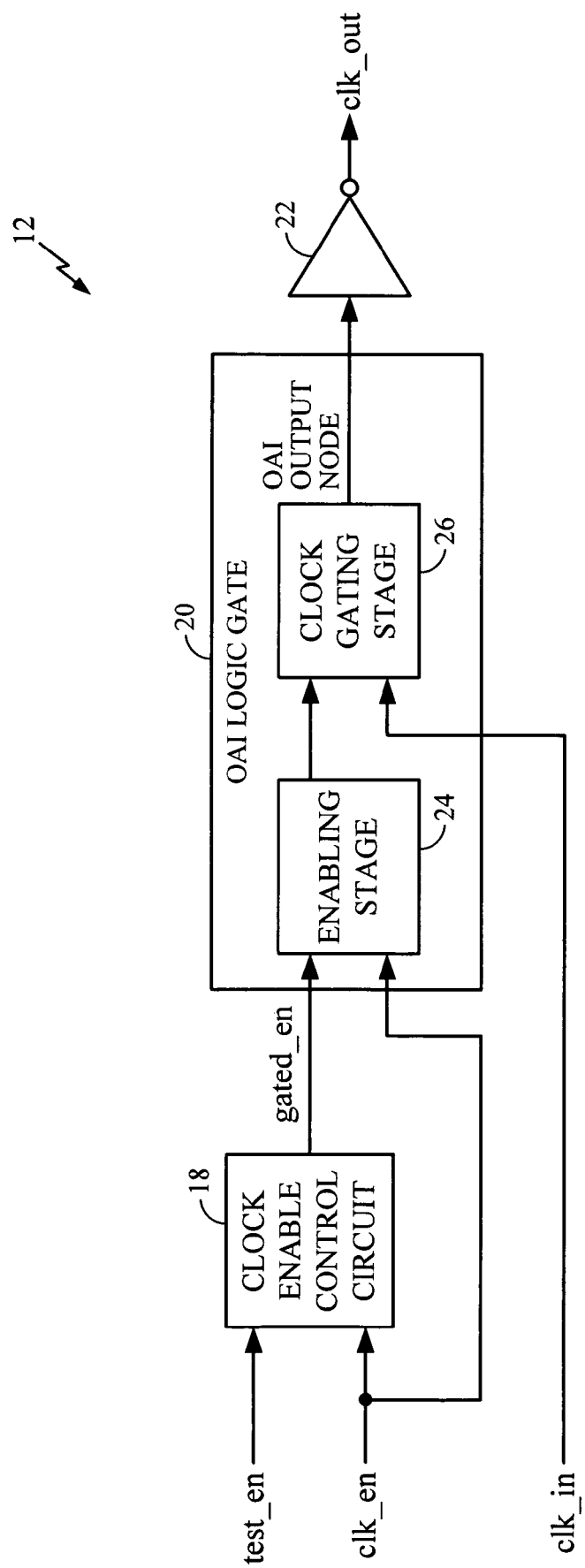
FIG. 2 is a block diagram of a multi-enabled clock gating circuit.
Figure 3:
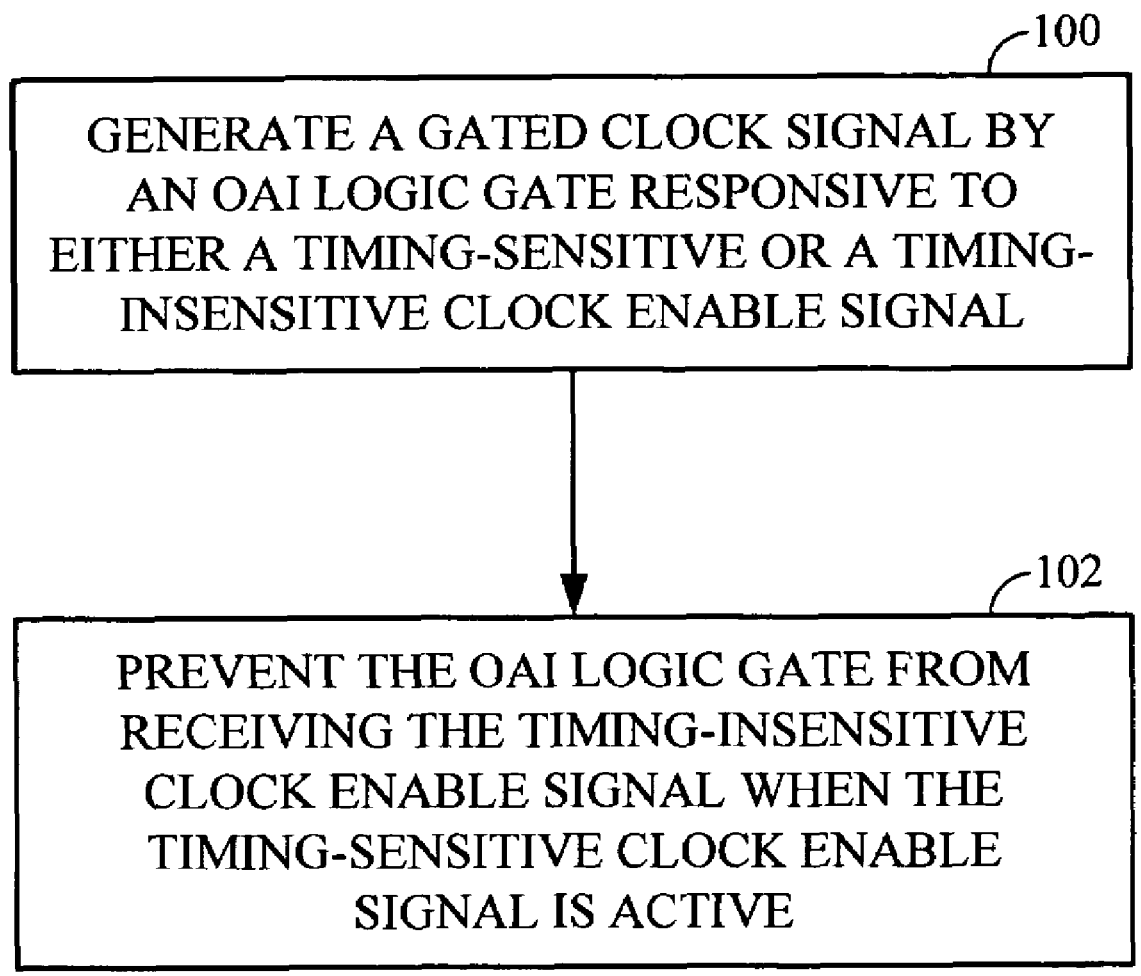
FIG. 3 is a logic flow diagram illustrating program logic for reducing clock enable setup time in a multi-enabled clock gating circuit.

FIG. 2 illustrates an embodiment of the multi-enabled clock gating circuit 12 of FIG. 1. The multi-enabled clock gating circuit 12 includes a clock enable control circuit 18, an OAI logic gate 20, and an inverter 22. The OAI logic gate 20, as illustrated by Step 100 of the program logic of FIG. 3, generates a gated clock signal output by inverting an input clock signal (clk_in) in response to one of a timing-sensitive or timing-insensitive clock enable signals being active. The clock enable control circuit 18, as illustrated by Step 102 of the program logic of FIG. 3, prevents the OAI logic gate 20 from receiving the timing-insensitive clock enable signal when the timing-sensitive clock enable signal is active. The inverter 22 outputs a clock signal (clk_out) approximately in phase with clk_in by inverting the gated clock signal output of the OAI logic gate 20.

The multi-enabled clock gating circuit 12 receives at least two clock enable signals. One clock enable signal, e.g., clk_en, is timing-sensitive. Other clock enable signals, e.g., test_en, are timing-insensitive. The compact topology of the OAI logic gate 20, described in detail later, enables clk_en to directly gate the input clock signal clk_in when clk_en is active. The timing-sensitive clock enable signal clk_en is not gated or otherwise processed by the clock enable control circuit 18, and thus, is not subjected to the signal propagation delay associated with the clock enable control circuit 18.

The clock enable control circuit 18 gates a timing-insensitive clock enable signal such as test_en using the timing-sensitive clock enable signal clk_en. Thus, the clock enable control circuit 18 prevents timing-insensitive clock enable signals from affecting the clock gating operation of the OAI logic gate 20 when clk_en is active. When clk_en is inactive, the clock enable control circuit 18 uses clk_en to gate a selected timing-insensitive clock enable signal such as test_en. The gated clock enable signal (gated_en) is provided to the OAI Logic gate 20 when the IC 10 is in a reduced-performance mode. The clock enable control circuit 18 may gate any number of timing-insensitive clock enable signals. For example, the clock enable control circuit 18 may comprise a multiplexer or other combinatorial and/or sequential logic for directing one of a plurality of timing-insensitive clock enable signals to the OAI logic gate 20 in response to a timing-sensitive clock enable signal being inactive.

The OAI logic gate 20 includes an enabling stage 24 and a clock gating stage 26. The enabling stage 24 enables the clock gating stage 26 when either gated_en or clk_en is active. Conversely, the enabling stage 24 disables the clock gating stage 26 when both gated_en and clk_en are inactive. The clock gating stage 26 of the OAI logic gate 20, when enabled, generates a gated clock signal at the output node of the OAI logic gate 20. The clock gating stage 26 generates the gated clock signal by inverting clk_in. Further, the clock gating stage 26 inhibits generation of the gated clock signal when disabled. In one example, the clock gating stage 26 inhibits generation of the gated clock signal by driving the output node of the OAI logic gate 20 to a fixed logic level. By driving the output node of the OAI logic gate 20 to a fixed logic level, the input clock signal clk_in is blocked or inhibited from passing to the output node.

Figure 4:
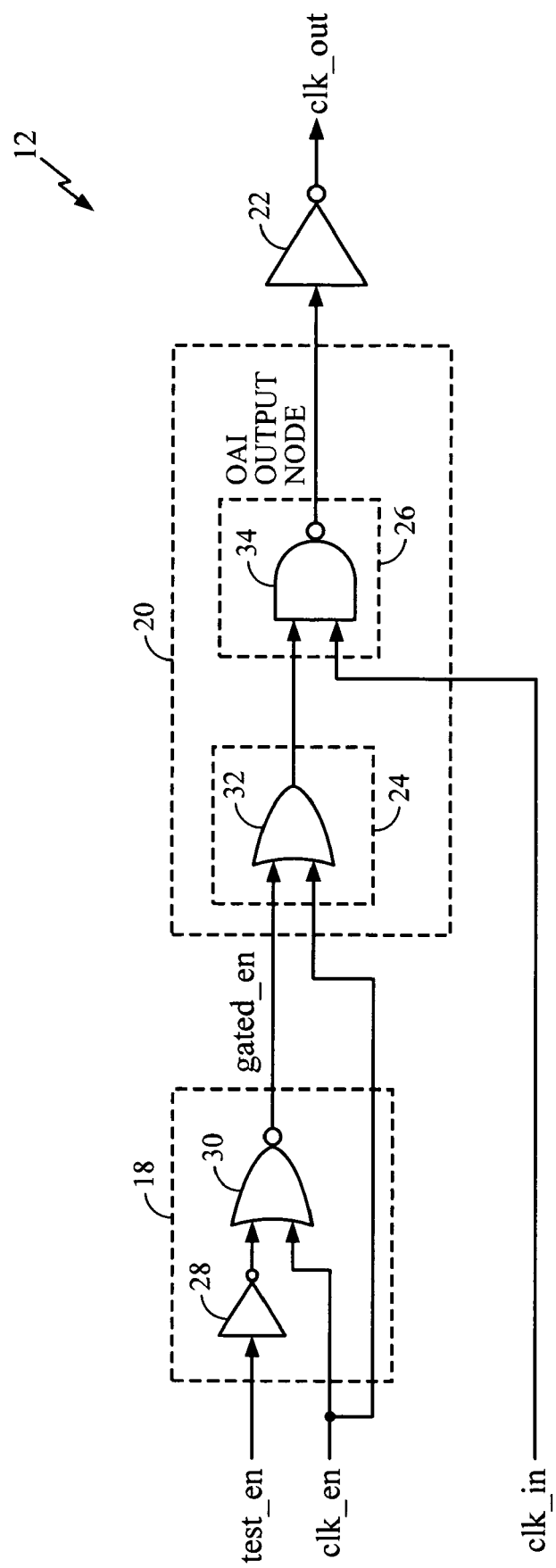
FIG. 4 is a circuit diagram of a multi-enabled clock gating circuit.

FIG. 4 illustrates a logic gate implementation of the multi-enabled clock gating circuit 12 of FIG. 1. The clock enable control circuit 18 comprises an inverter 28 and a two-input NOR gate 30. The inverter 28 inverts the timing-insensitive clock enable signal test_en. The two-input NOR gate 30 generates the gated timing-insensitive clock enable signal gated_en. When clk_en is active, e.g., at a logic high level, the clock enable control circuit 18 inhibits test_en from passing to the enabling stage 24. Conversely, when clk_en is inactive and test_en is active, the clock enable control circuit 18 passes test_en to the enabling stage 24 via gated_en.

The enabling stage 24 of the OAI logic gate 20 comprises a two-input OR gate 32. The two-input OR gate 32 directly receives clk_en at one input and receives gated_en from the clock enable control circuit 18 at another input. In operation, the two-input OR gate 32 enables the clock gating stage 26 in response to either clk_en or gated_en being active. Conversely, when both clk_en and gated_en are inactive, the two-input OR gate 32 disables the clock gating stage 26.

The clock gating stage 26 comprises a two-input NAND gate 34. The two-input NAND gate 34 generates a gated clock signal at the output node of the OAI logic gate 20 by inverting clk_in when enabled. When disabled, the two-input NAND gate 34 drives the output node of the OAI logic gate 20 to a fixed voltage level. That is, the two-input NAND gate 34 inhibits clk_in from propagating to the downstream circuits 16 by driving the output node of the OAI logic gate 20 to a fixed voltage level.

Figure 5:
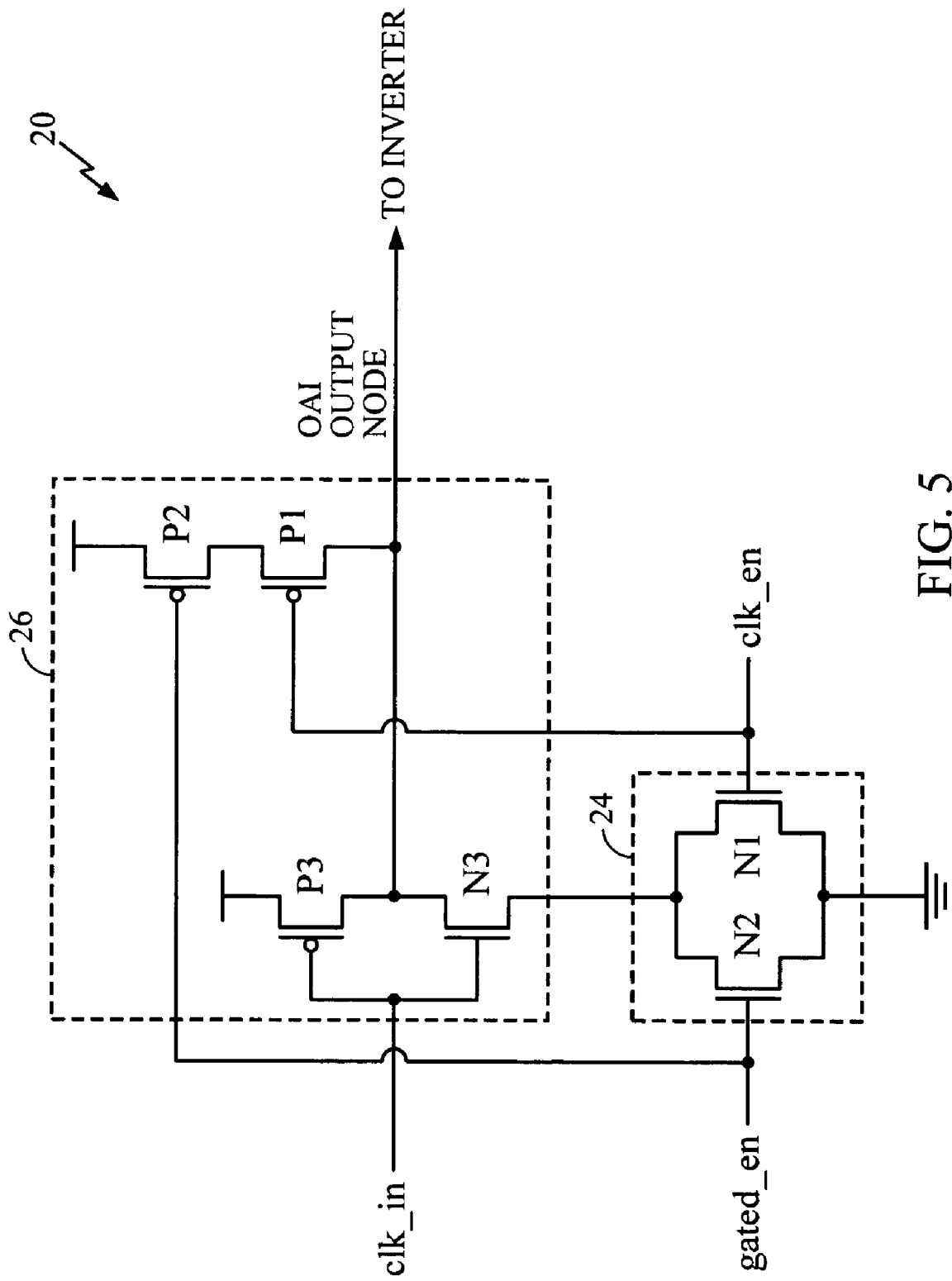
FIG. 5 is a circuit diagram of an OAI logic gate for use in a multi-enabled clock gating circuit.

FIG. 5 illustrates a transistor implementation of the OAI logic gate 20 of FIG. 2. The enabling stage 24 of the OAI logic gate 20 includes a pull-down network comprising n-channel transistors N1 and N2 coupled in parallel. The clock gating stage 26 includes a pull-up network comprising p-channel transistors P1 and P2 coupled in series. The clock gating stage 26 further includes an inverter comprising p-channel transistor P3 coupled in series with n-channel transistor N3.

The pull-down network of the enabling stage 24 enables the clock gating stage 26 when one of the clock enable signals is active and disables the clock gating stage when both clock enable signals are inactive. In one example, the pull-down network enables the clock gating stage 26 by providing a ground source to the clock gating stage 26 when either clk_en or gated_en is active. Conversely, the pull-down network disables the clock gating stage 26 by removing the ground source from the clock gating stage 26 when both clk_en and gated_en are inactive.

In operation, the pull-down network provides a ground source to the clock gating stage 26 when either transistor N1 or N2 is switched 'on'. Transistors N1 and N2 are switched 'on' when their respective gate inputs are at a logic high level. Transistor N1 directly receives the timing-sensitive clock enable signal clk_en at its gate input. Transistor N2 receives the gated timing-insensitive clock enable signal gated_en from the clock enable control circuit at its gate input. Thus, when either clk_en or gated_en is active, the pull-down network enables the clock gating stage 26 by providing a ground source to the clock gating stage. Conversely, when both clk_en and gated_en are inactive, the pull-down network is turned off, thus disabling the clock gating stage 26 by removing the ground source from the clock gating stage.

The inverter of the clock gating stage 26 generates the gated clock signal at the output node of the OAI logic gate when the clock gating stage 26 is enabled. The inverter generates the gated clock signal by inverting the input clock signal (clk_in). In one example, the clock gating stage 26 is enabled when transistor N3 is coupled to a ground source at its respective source node. The clock gating stage 26 is disabled when the ground source is removed from the source node of transistor N3. The inverter does not function properly when the source node of transistor N3 floats indeterminately. As a result, the pull-up network inhibits generation of the gated clock signal with little contention from the inverter when the clock gating stage is disabled.

The pull-up network of the clock gating stage 26 inhibits generation of the gated clock signal when all clock enable signals are inactive by driving the output node of the OAI logic gate 20 to a fixed voltage level. As such, the input clock signal clk_in is effectively blocked or inhibited from passing to the output node of the OAI logic gate 20. In operation, transistors P1 and P2 are switched 'on' when their respective gate inputs are at a logic low level. Transistor P1 directly receives the timing-sensitive clock enable signal clk_en at its gate input. Transistor P2 receives the gated timing-insensitive clock enable signal gated_en from the clock enable control circuit at its gate input. Thus, when both clk_en and gated_en are inactive, transistors P1 and P2 are switched 'on' and drive the output node of the OAI logic gate 20 to a fixed voltage level. Conversely, when either clk_en or gated_en is active, the pull-up network is turned off and does not drive the output node of the OAI logic gate 20 to a fixed voltage level. As such, the pull-up network does not prevent the inverter from generating the gated clock signal output.

The compact topology of the OAI logic gate 20 enables the timing-sensitive clock enable signal clk_en to directly gate the input clock signal clk_in without subjecting clk_en to delay not experienced by clk_in. Particularly, the logic OR function of the enabling stage 24 and the logic NAND function of the clock gating stage 26 may be condensed into a single-stage transistor implementation. That is, all signals received by the OAI gate are subjected to or processed by one stage of complimentary transistors. By subjecting clk_en and clk_in to one stage of complimentary transistors to activate clock gating, e.g., N1/P1 and N3/P3, respectively, both signals experience the same delay, thus reducing the setup time associated with clk_en. However, the compact topology of the OAI logic gate 20 may result in non-uniform clock latency.

Non-uniform clock latency occurs when the clock gating stage 26 of the OAI logic gate 20 is subjected to varying capacitance. Particularly, the clock gating stage 26 is subjected to additional diffusion capacitance when the IC 10 is in a reduced-performance mode. If the additional diffusion capacitance is not accounted for, the pull-down network will need more time to dissipate charge present at the output node of the OAI logic gate 20 than it would if it were not subjected to the additional diffusion capacitance. As a result, the clock gating stage 26 will increase the delay imparted on the gated clock signal output in proportion to the additional diffusion capacitance.

In operation, clk_en is inactive when the IC 10 is in a reduced-performance mode. In response to clk_en being inactive, transistor N1 is off and transistor P1 is on. Conversely, when the IC 10 is in a peak-performance mode, gated_en is active, switching transistor N2 on and transistor P2 off. Because transistor P1 is on when IC 10 is in a reduced-performance mode, the clock gating stage 26 is subjected to the diffusion capacitance of P2. However, when IC 10 is in a peak-performance mode, transistor P1 is off. Thus, the clock gating stage 26 is not subjected to the diffusion capacitance of transistor P2. Although the diffusion capacitance of P2 is relatively small compared to the output node capacitance of the OAI logic gate 20, if left uncompensated, the diffusion capacitance may cause non-uniform clock latency.

Non-uniform clock latency may be corrected by properly sizing the transistors of the pull-down network of the enabling stage 24. For example, by properly sizing transistors N1 and N2, the corresponding latency of the multi-enabled clock gating circuit 12 during peak-performance and reduced-performance modes of the IC 10 is approximately equivalent. Particularly, transistor N2 is sized sufficiently larger than transistor N1 so that the diffusion capacitance of transistor P2 is accounted for when IC 10 is in a reduced-performance mode. For example, transistor N2 is fabricated with a larger channel width as compared to transistor N1. If transistor N2 is sized sufficiently larger than transistor N1 to account for the diffusion capacitance of transistor P2 when transistor P1 is on, then the pull-down network of the enabling stage 24 discharges the output node of the OAI logic gate 20 in approximately the same amount of time in both peak-performance and reduced-performance modes. Thus, the downstream circuits 16 need only account for one uniform clock latency, thereby improving performance of the IC.

With the above range of variations and applications in mind, it should be understood that the present disclosure is not limited by the foregoing description, nor is it limited by the accompanying drawings. Instead, the present disclosure is limited only by the following claims and their legal equivalents.

What is claimed is:

1. A multi-enabled clock gating circuit, comprising:
   an OAI logic gate configured to generate a gated clock signal by inverting an input clock signal responsive to one of a timing-sensitive clock enable signal and a timing-insensitive clock enable signal being active; and
   a clock enable control circuit configured to prevent the OAI logic gate from receiving the timing-insensitive clock enable signal responsive to the timing-sensitive clock enable signal being active.

2. The multi-enabled clock gating circuit of claim 1, wherein the OAI logic gate comprises:
   a clock gating stage configured to generate the gated clock signal by inverting the input clock signal when the clock gating stage is enabled and inhibit generation of the gated clock signal when the clock gating stage is disabled; and
   an enabling stage configured to enable the clock gating stage responsive to one of the clock enable signals being active and disable the clock gating stage responsive to the clock enable signals being inactive.

3. The multi-enabled clock gating circuit of claim 2, wherein the enabling stage of the OAI logic gate comprises a pull-down network configured to enable the clock gating stage responsive to one of the clock enable signals being active and disable the clock gating stage responsive to the clock enable signals being inactive.

4. The multi-enabled clock gating circuit of claim 3, wherein the pull-down network is configured to enable the clock gating stage of the OAI logic gate by providing a ground source to the clock gating stage responsive to one of the clock enable signals being active and disable the clock gating stage by removing the ground source from the clock gating stage responsive to the clock enable signals being inactive.

5. The multi-enabled clock gating circuit of claim 4, wherein the pull-down network comprises first and second n-channel transistors coupled in parallel, the first n-channel transistor configured to receive the timing-sensitive clock enable signal at its gate input, the second n-channel transistor configured to receive the timing-insensitive clock enable signal at its gate input, the n-channel transistors in parallel configured to enable the clock gating stage of the OAI logic gate by providing the ground source to the clock gating stage responsive to one of the clock enable signals being active and disable the clock gating stage by removing the ground source from the clock gating stage responsive to the clock enable signals being inactive.

6. The multi-enabled clock gating circuit of claim 5, wherein the second n-channel transistor is sized to dissipate charge in substantially the same amount of time as the first n-channel transistor.

7. The multi-enabled clock gating circuit of claim 3, wherein the pull-down network is further configured to dissipate charge in substantially the same amount of time responsive to either of the clock enable signals being active.

8. The multi-enabled clock gating circuit of claim 2, wherein the clock gating stage of the OAI logic gate comprises a pull-up network configured to inhibit the generation of the gated clock signal when the clock gating stage is disabled.

9. The multi-enabled clock gating circuit of claim 8, wherein the pull-up network is configured to inhibit the generation of the gated clock signal when the clock gating stage is disabled by driving an output node of the OAI logic gate to a fixed voltage level responsive to the clock enable signals being inactive.

10. The multi-enabled clock gating circuit of claim 9, wherein the pull-up network comprises first and second p-channel transistors coupled in series, the first p-channel transistor configured to receive the timing-sensitive clock enable signal at its gate input, the second p-channel transistor configured to receive the timing-insensitive clock enable signal at its gate input, the p-channel transistors in series configured to inhibit the generation of the gated clock signal when the clock gating stage is disabled by driving the output node of the OAI logic gate to the fixed voltage level responsive to the clock enable signals being inactive.

11. The multi-enabled clock gating circuit of claim 2, wherein the clock gating stage of the OAI logic gate further comprises an inverter configured to generate the gated clock signal by inverting the input clock signal when the clock gating stage is enabled.

12. The multi-enabled clock gating circuit of claim 1, wherein the clock enable control circuit comprises a logic gate configured to prevent the OAI logic gate from receiving the timing-insensitive clock enable signal responsive to the timing-sensitive clock enable signal being active.

13. An integrated circuit comprising the multi-enabled clock gating circuit of claim 1.

14. The integrated circuit of claim 13, wherein the timing-sensitive clock enable signal is configured to enable the multi-enabled clock gating circuit during a peak-performance operating mode of the integrated circuit and the timing-insensitive clock enable signal is configured to enable the multi-enabled clock gating circuit during a reduced-performance operating mode of the integrated circuit.

15. An OAI logic gate for use in a multi-enabled clock gating circuit, comprising:
   a clock gating stage configured to generate a gated clock signal by inverting an input clock signal when the clock gating stage is enabled and inhibit the generation of the gated clock signal when the clock gating stage is disabled; and
   an enabling stage configured to enable the clock gating stage responsive to one of a timing-sensitive clock enable signal and a timing-insensitive clock enable being active and disable the clock gating stage responsive to the clock enable signals being inactive.

16. The OAI logic gate of claim 15, wherein the enabling stage of the OAI logic gate comprises a pull-down network configured to enable the clock gating stage responsive to one of the clock enable signals being active and disable the clock gating stage responsive to the clock enable signals being inactive.

17. The OAI logic gate of claim 16, wherein the pull-down network is configured to enable the clock gating stage of the OAI logic gate by providing a ground source to the clock gating stage responsive to one of the clock enable signals being active and disable the clock gating stage by removing the ground source from the clock gating stage responsive to the clock enable signals being inactive.

18. The OAI logic gate of claim 17, wherein the pull-down network comprises first and second n-channel transistors coupled in parallel, the first n-channel transistor configured to receive the timing-sensitive clock enable signal at its gate input, the second n-channel transistor configured to receive the timing-insensitive clock enable signal at its gate input, the n-channel transistors in parallel configured to enable the clock gating stage of the OAI logic gate by providing the ground source to the clock gating stage responsive to one of the clock enable signals being active and disable the clock gating stage by removing the ground source from the clock gating stage responsive to the clock enable signals being inactive.

19. The OAI logic gate of claim 18, wherein the second n-channel transistor is sized to dissipate charge in substantially the same amount of time as the first n-channel transistor.

20. The OAI logic gate of claim 16, wherein the pull-down network is further configured to dissipate charge in substantially the same amount of time responsive to either of the clock enable signals being active.

21. The OAI logic gate of claim 15, wherein the clock gating stage of the OAI logic gate comprises a pull-up network configured to inhibit the generation of the gated clock signal when the clock gating stage is disabled.

22. The OAI logic gate of claim 21, wherein the pull-up network is configured to inhibit the generation of the gated clock signal when the clock gating stage is disabled by driving an output node of the OAI logic gate to a fixed voltage level responsive to the clock enable signals being inactive.

23. The OAI logic gate of claim 22, wherein the pull-up network comprises first and second p-channel transistors coupled in series, the first p-channel transistor configured to receive the timing-sensitive clock enable signal at its gate input, the second p-channel transistor configured to receive the timing-insensitive clock enable signal at its gate input, the p-channel transistors in series configured to inhibit the generation of the gated clock signal when the clock gating stage is disabled by driving the output node of the OAI logic gate to the fixed voltage level responsive to the clock enable signals being inactive.

24. The multi-enabled clock gating circuit of claim 15, wherein the clock gating stage of the OAI logic gate further comprises an inverter configured to generate the gated clock signal at an output node of the OAI logic gate by inverting the input clock signal when the clock gating stage is enabled.

25. A method of reducing clock enable setup time in a multi-enabled clock gating circuit by an OAI logic gate, comprising:
 generating a gated clock signal by inverting an input clock signal responsive to one of a timing-sensitive clock enable signal and a timing-insensitive clock enable signal being active; and
 preventing the OAI logic gate from receiving the timing-insensitive clock enable signal responsive to the timing-sensitive clock enable signal being active.

26. The method of claim 25, wherein generating the gated clock signal by inverting the input clock signal comprises generating the gated clock signal by inverting the input clock signal when a clock gating stage of the OAI logic gate is enabled.

27. The method of claim 26, further comprising:
 inhibiting generation of the gated clock signal when the clock gating stage is disabled;
 enabling the clock gating stage responsive to one of the clock enable signals being active; and
 disabling the clock gating stage responsive to the clock enable signals being inactive.

28. The method of claim 27, wherein enabling the clock gating stage comprises providing a ground source to the clock gating stage responsive to one of the clock enable signals being active and disabling the clock gating stage comprises removing the ground source from the clock gating stage responsive to the clock enable signals being inactive.

29. The method of claim 27, wherein inhibiting generation of the gated clock signal when the clock gating stage is disabled comprises driving an output node of the OAI logic gate to a fixed voltage level responsive to the clock enable signals being inactive.

30. The method of claim 25, further comprising dissipating charge by the OAI logic gate in substantially the same amount of time responsive to either of the clock enable signals being active.

* * * * *